(12) United States Patent
Sato et al.

(10) Patent No.: US 6,971,799 B2
(45) Date of Patent: Dec. 6, 2005

(54) ROLLING BEARING UNIT

(75) Inventors: Yukio Sato, Kanagawa (JP); Katsuhiro Konno, Kanagawa (JP)

(73) Assignee: NSK. Ltd., Tokyo (JP)

( * ) Notice: Subject to any disclaimer, the term of this patent is extended or adjusted under 35 U.S.C. 154(b) by 0 days.

(21) Appl. No.: 10/420,873

(22) Filed: Apr. 23, 2003

(65) Prior Publication Data

US 2003/0218548 A1    Nov. 27, 2003

(30) Foreign Application Priority Data

Apr. 23, 2002 (JP) .......................... P.2002-120912
Jan. 23, 2003 (JP) .......................... P.2003-014144

(51) Int. Cl.[7] ............................................. F16C 19/38
(52) U.S. Cl. .................................................... 384/448
(58) Field of Search ............................... 384/448, 544, 384/537, 624, 589

(56) References Cited

U.S. PATENT DOCUMENTS

| | | |
|---|---|---|
| 4,237,454 A | 12/1980 | Meyer |
| 5,231,391 A | 7/1993 | Rigaux |
| 5,372,435 A | 12/1994 | Genero et al. |
| 6,161,962 A | 12/2000 | French et al. |
| 6,619,849 B2 * | 9/2003 | Katano .................... 384/448 |

FOREIGN PATENT DOCUMENTS

| | | |
|---|---|---|
| EP | 0 594 550 A1 | 4/1994 |
| EP | 1 147 829 A1 | 10/2001 |
| EP | 1 147 830 A2 | 10/2001 |
| JP | 59-23889 B | 6/1984 |
| JP | 2001-353508 A | 12/2001 |
| JP | 2002-5156 A | 1/2002 |
| WO | WO 00/51869 | 9/2000 |

* cited by examiner

Primary Examiner—Lenard A. Footland
(74) Attorney, Agent, or Firm—Sughrue Mion, PLLC

(57) ABSTRACT

A four-row tapered roller bearing is incorporated in the clearance between the inner surface of a housing and the outer surface of a rolling roller. A pair of supporting members supporting sensor devices are fitted in and supported by a part of the inner surface of the housing in such a manner that they are opposed to the ends of outer rings of the four-row tapered roller bearing disposed close to the both axial ends thereof. The sensor devices each comprise a distortion gauge as a detecting portion and a first coil for transmitting as a wireless signal a signal obtained by processing an output signal outputted from the distortion gauge. A second coil for receiving the wireless signal transmitted by the first coil is retained on a part of a member other than the supporting members.

10 Claims, 11 Drawing Sheets

ROLLING BEARING UNIT

BACKGROUND OF THE INVENTION

1. Field of the Invention

The present invention relates to a rolling bearing unit including a rolling bearing and a sensor device, which bears various rolls of rolling mill for iron and steel, paper manufacturing machine, etc. rotatably with respect to a fixed portion and detects the load axially imposed on the rolling bearing (axial load) to judge the deterioration of the machines or adjust the axial load so as to prolong the bearing life.

2. Description of the Related Art

For example, a rolling bearing for roll neck which bears a roller of rolling mill for iron and steel is subject to not only radial load but also axial load during operation. This axial load varies with the degree of deterioration of the rolling mill. Accordingly, the degree of deterioration of the rolling mill can be judged by detecting the axial load. Further, by adjusting the axial load imposed on a member in which an outer ring or inner ring constituting the rolling bearing is fitted to a proper value depending on the axial load thus detected, the fatigue life of the rolling bearing can be prolonged.

FIGS. 12 to 14 each show an example of a rolling bearing unit with a sensor device described in JP-B-59-23889 which was invented under these circumstances. A rolling roller 1 incorporated in a rolling mill has a roll neck 2 which is born rotatably relative to a fixed housing 3 by a double-row cylindrical roller bearing 4 and a pair of tapered roller bearings 5, 5. The tapered roller bearings 5, 5 are provided on both sides of the double-row cylindrical roller bearing 4. The double-row cylindrical roller bearing 4 can bear the radial load imposed on the rolling roller 1. On the contrary, the tapered roller bearings 5, 5 can bear the axial load imposed on the rolling roller 1. The double-row cylindrical roller bearing 4 has an outer ring 6a and an inner ring, and the tapered roller bearings 5, 5 have outer ring 6b, 6b and inner rings, respectively. An outer surface of the outer ring 6a and an inner surface of a middle portion of the housing 3 are kept in close contact with each other. A minute clearance is provided between outer surfaces of the outer rings 6b, 6b and an inner surface of both ends of the housing 3, respectively.

Supporting members 7, 7 are fitted in and supported by the inner surface of the housing 3 in the space disposed on both axial ends of the outer rings 6b, 6b, respectively. Each of the supporting members 7, 7 has an annularly formed main body 8 and substantially arc protrusions 9, 9. The protrusions 9, 9 are screwed on an outer surface of the main body 8 at a plurality of circumferential positions. Each of the protrusions 9, 9 has a convex portion 10 and a concave portion 11. The convex portion 10 is provided on one axial end of the protrusions 9, 9 (back side as viewed on FIG. 13 or upper side as viewed on FIG. 14) and in a middle portion of the protrusion 9 along the circumference of the main body 8. The concave portion 11 is provided on the other axial end of the protrusions 9, 9 (front side as viewed on FIG. 13 or lower side as viewed on FIG. 14) at a position opposite the convex portion 10. Each of distortion gauges 12, 12 are attached to an inner side of the concave portion 11.

With a forward end of the convex portions 10 being butted to the end of the small diameter side of the outer rings 6b, 6b, the protrusions 9, 9 each are disposed interposed between the outer rings 6b, 6b and the part of the housing 3.

The distortion gauges 12, 12 each are connected to a bridge circuit (not shown) provided there outside with harnesses 13, 13. The bridge circuit is connected to a distortion meter (not shown).

According to the rolling bearing unit with the sensor device having the constitution described in the JP-B-59-23889, the distortion outputted to a display of the distortion meter and the relationship between distortion and load previously determined can be used to determine the axial load imposed on the tapered roller bearings 5, 5.

As the related art technical references relating to the present invention, there are also JP-A-2001-35308 and JP-A-2002-5156 which disclose a rolling bearing unit with a sensor device for detecting the load imposed axially on a rolling bearing.

The rolling bearing unit with the sensor device described in the above-mentioned JP-B-59-23889 leaves the following points to be desired:

(1) The end of the harnesses 13, 13 connected to the bridge circuit are connected to the distortion gauges 12, 12 provided on the supporting members 7, 7 fitted in and supported by the housing 3. In practice, however, the bridge circuit is often disposed at a position remote from the rolling bearing unit with the sensor device. Accordingly, it is necessary that the harnesses 13, 13 be long enough. In this arrangement, the harnesses 13, 13 interfere in the replacement of the tapered roller bearings 5, 5 or double-row cylindrical roller bearing 4 or the rolling roller 1. Thus, the replacement of these parts becomes troublesome. If the supporting members 7, 7 rotate relative to the housing 3, it is likely that the harnesses 13, 13 can break.

(2) Since the supporting members 7, 7 each have the plurality of protrusions 9, 9 screwed on the main body 8, they are troublesome to assemble. In order to enhance the detecting precision of the distortion gauges 12, 12, it is necessary that the forward end of the convex portions 10 provided on the protrusions 9, 9 be positioned accurately on the same virtual plane extending perpendicular to the central axis of the supporting members 7, 7, respectively. However, the main body 8 and the protrusions 9, 9 are separately formed. Therefore, it is troublesome to secure the dimensional precision and shape precision of the protrusions 9, 9 with respect to the main body 8, and then assemble the supporting members 7, 7 in such an arrangement that the forward end of the convex portions 10 of the protrusions 9, 9 are accurately positioned on the same virtual plane. Accordingly, it is difficult to enhance the detection precision of the distortion gauges 12, 12 while preventing the rise of cost of the rolling bearing unit with the sensor device.

Further, according to the structure disclosed in the above-mentioned JP-A-2001-353508 and JP-A-2002-5156, a supporting member by which the sensor device is supported is not fitted in and supported by a housing in which an outer ring as a fixed ring is fitted in such an arrangement that the supporting member is opposed to an axial end of the outer ring. Further, this sensor device is provided on the inner surface of the housing. In this arrangement, the load imposed axially on the rolling bearing can be difficultly detected to a good precision.

SUMMARY OF THE INVENTION

It is an object of the present invention to provide a rolling bearing unit.

A rolling bearing unit of the present invention comprises a rolling bearing and a sensor device as in the related art rolling bearing with the sensor device shown in FIGS. 12 to 14 above.

The rolling bearing comprises an inner ring and an outer ring one of which is a rotary ring and the other is a fixed ring, which rotate relative to each other, and a plurality of rolling elements disposed rotatably interposed between an outer ring raceway formed on an inner surface of the outer ring and an inner ring raceway formed on an outer surface of the inner ring. The sensor device detects the load imposed axially on the rolling bearing.

Further, the rolling bearing unit of the present invention comprises a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal; a supporting member for supporting the sensor device, fitted in and supported by a member in which the outer ring or inner ring as the fixed ring is fitted in such an arrangement that it is opposed to an axial end of the outer ring or inner ring as the fixed ring; and a member having at least a part of a receiving device for receiving the wireless signal transmitted from the transmitting device, the member being separately formed from the supporting member. The detecting portion of the sensor device detects the load imposed axially on the supporting member by the outer ring or inner ring as the fixed ring to detect the load imposed axially on the rolling bearing.

In the above-mentioned rolling bearing of the present invention, the supporting member may comprise an annularly formed main body and protrusions provided axially protruding at a plurality of circumferential positions on both axial ends of the main body in such an arrangement that circumferential phases of the protrusions disposed on the both axial ends of the main body coincide with each other. The main body may have inner annular wall portions and outer annular wall portions, which radially protrude and disposed on the both axial ends of the main body respectively. The main body and protrusions may be integrally formed by working a metallic material. The detecting portion of the sensor device may be disposed on a portion of the periphery of the main body where it coincides with one of the protrusions in the circumferential phase.

Further, in the above-mentioned rolling bearing of the present invention, the sensor device may comprise a modulation/demodulation circuit and a coil as the transmitting device, the modulation/demodulation circuit combining the output signal outputted from the detecting portion with a carrier wave to produce a modulated wave or taking a modulation signal out of the modulated wave received through the coil, the coil transmitting and receiving the modulated wave as the wireless signal.

Moreover, in the above-mentioned rolling bearing of the present invention, the sensor device may comprise a modulation circuit and a coil as the transmitting device, the modulation circuit combining the output signal outputted from the detecting portion with a carrier wave to produce a modulated wave, the coil transmitting the modulated wave as the wireless signal.

Further, in the above-mentioned rolling bearing of the present invention, the sensor device may comprise a modulation circuit and an antenna as the transmitting device, the modulation circuit combining the output signal outputted from the detecting portion with a carrier wave to produce a modulated wave, the antenna transmitting the modulated wave as the wireless signal.

In the above-mentioned rolling bearing of the present invention, the sensor device may comprise an electronic tag having a memory, a control section and a transmission/reception section as the transmitting device, the transmission/reception transmitting and receiving the wireless signal.

According to the rolling bearing unit of the present invention with this constitution, a detected value of load represented by an output signal outputted from the detecting portion of the sensor device or a signal obtained by processing the output signal can be outputted to an output section of an output device provided on a receiving device side. In this arrangement, the operator can easily judge how much the machine provided with this rolling bearing is deteriorated. Further, by adjusting the axial load imposed axially on the member in which the inner ring or outer ring is fitted depending on the detected value of load using an adjustor, the axial load imposed on the rolling bearing can be adjusted to a proper value, making it possible to prolong the life of the rolling bearing. Moreover, the harness or cable for transmitting the signal can be shortened, making it possible to easily replace the member in which the inner ring or outer ring is fitted or the rolling bearing. Further, in the case where the sensor device is provided with the entire transmitting device, it is not necessary to connect the harness or cable to the supporting member by which the sensor device is supported, making the replacement easier. This arrangement also makes it possible to prevent the breaking of the harness or cable.

Further, the supporting member is fitted in and supported by the member in which the outer ring or inner ring as a fixed ring is fitted in such an arrangement that the supporting member is opposed to the axial end of the outer ring or inner ring as the fixed ring. The sensor device, which comprises the detecting portion for detecting the load imposed axially on the supporting member by the outer ring or inner ring as the fixed ring and at least the part of the transmitting device for transmitting the output signal outputted from of the detecting portion or the signal obtained by processing the output signal as a wireless signal, is supported by a part of the supporting member. In this arrangement, the invention can easily detect the load imposed axially on the rolling bearing to a good precision.

Moreover, according to the rolling bearing unit of the present invention, it is not necessary that a plurality of members which are separate bodies be combined to form the supporting member. In this arrangement, the production of the rolling bearing unit with the sensor device can be simplified. Further, a side surface, which is provided on a part of the supporting member for butting to a mating member disposed axially opposed to the supporting member, can be positioned on the same virtual plane extending perpendicular to the central axis of the supporting member without the necessity of troublesome assembly. In this arrangement, the detecting precision of the sensor device can be enhanced while preventing cost rise.

Further, according to the rolling bearing unit of the present invention, the plurality of protrusions for butting to the mating member may be provided at positions where the phase of one of protrusions in the circumferential direction of the supporting member coincides with that of the detecting portion of the sensor device provided on a part of the supporting member. If the sensor device has a plurality of the detecting portions, the circumferential phases of protrusions coincide with those of the detecting portions. In this arrangement, the detecting precision of the sensor device can be enhanced. Moreover, the area of the forward end of the plurality of protrusions, which are subject to load imposed by the mating member, among the parts of the supporting member can be reduced, making it possible to enhance the detecting precision of the sensor device.

Further, according to the rolling bearing unit of the present invention, an external inputting device is provided with a transmitting device for transmitting data to be recorded in the memory constituting the electronic tag as a wireless signal. In this arrangement, data representing information to be managed with regard to the rolling bearing unit with the sensor device such as production step, flow, sale, use, failure and repair can be recorded in the memory without connecting the electronic tag and the external inputting device to the harness or cable. Moreover, the external outputting device such as portable data terminal is provided with a receiving portion for receiving the wireless signal generated by the electronic tag. In this arrangement, date recorded in the memory can be outputted as necessary, making it possible to easily manage the data to be managed. Further, in the case where the rolling bearing unit with the sensor device is no longer required, the data to be managed can be utilized to reuse it easily. Moreover, by arranging the rolling bearing unit with the sensor device such that data representing the material and disassembly step of the rolling bearing unit with the sensor device can be freely recorded in the memory, the disassembly of the rolling bearing unit with the sensor device and the classification of parts thus produced into reusable resources can be automated, facilitating complete recycling that produces no waste parts.

DETAILED DESCRIPTION OF THE INVENTION

Figure 1:
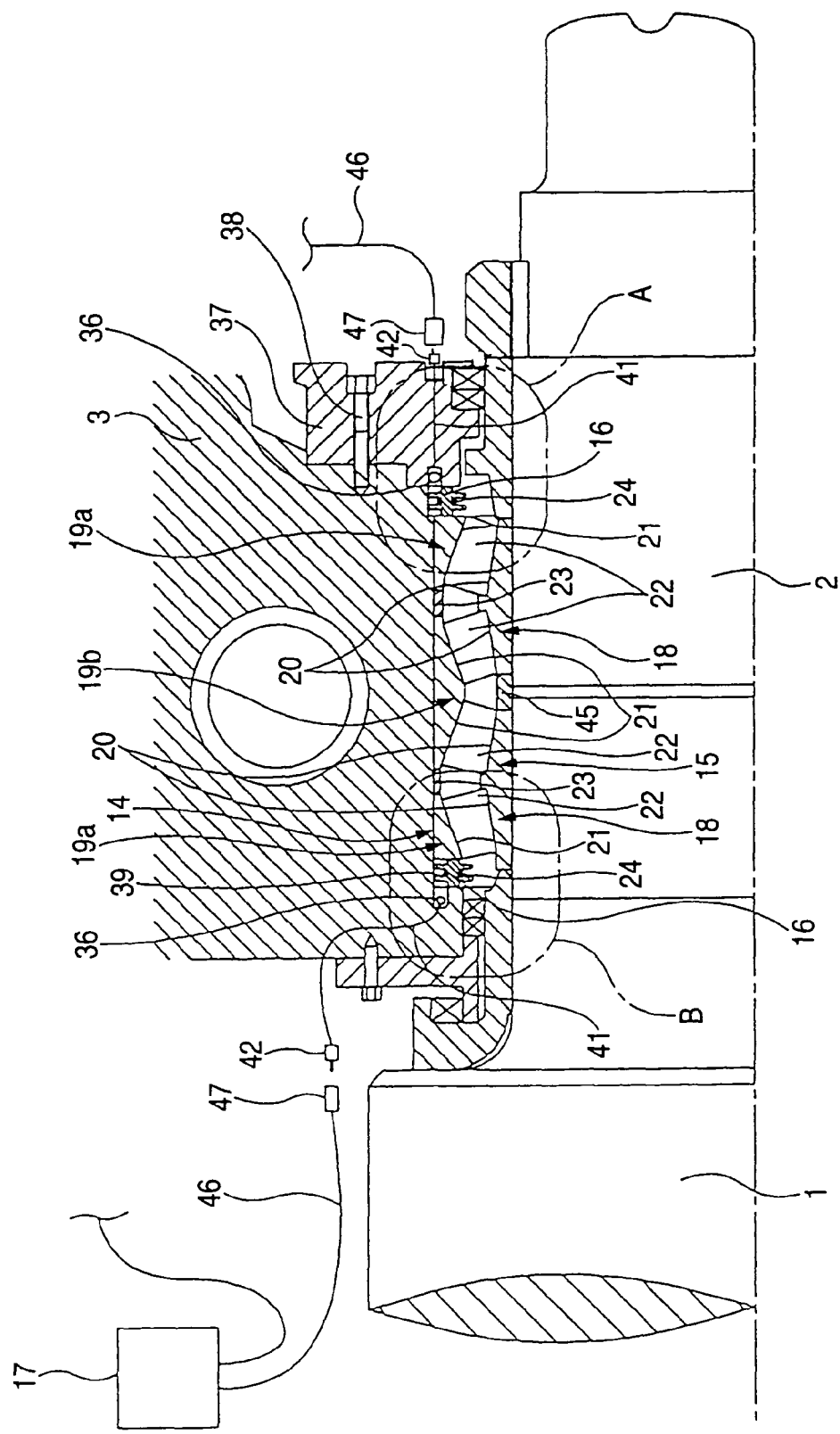
FIG. 1 is a half-sectional view showing a rolling bearing unit with a sensor device according to a first embodiment of the present invention.
Figure 2:
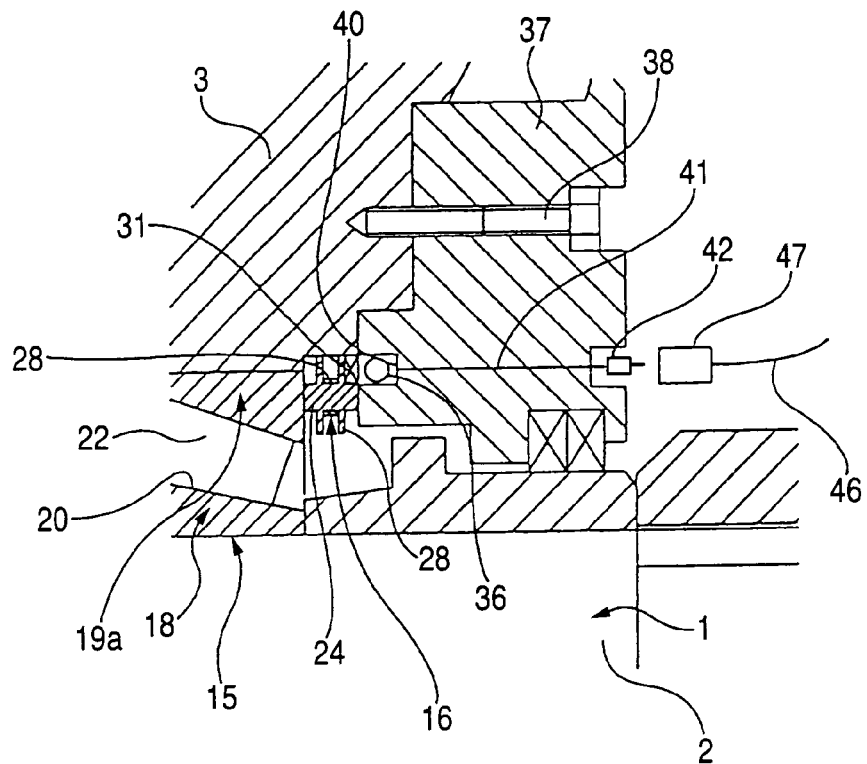
FIG. 2 is an enlarged sectional view of a portion A of FIG. 1.
Figure 3:
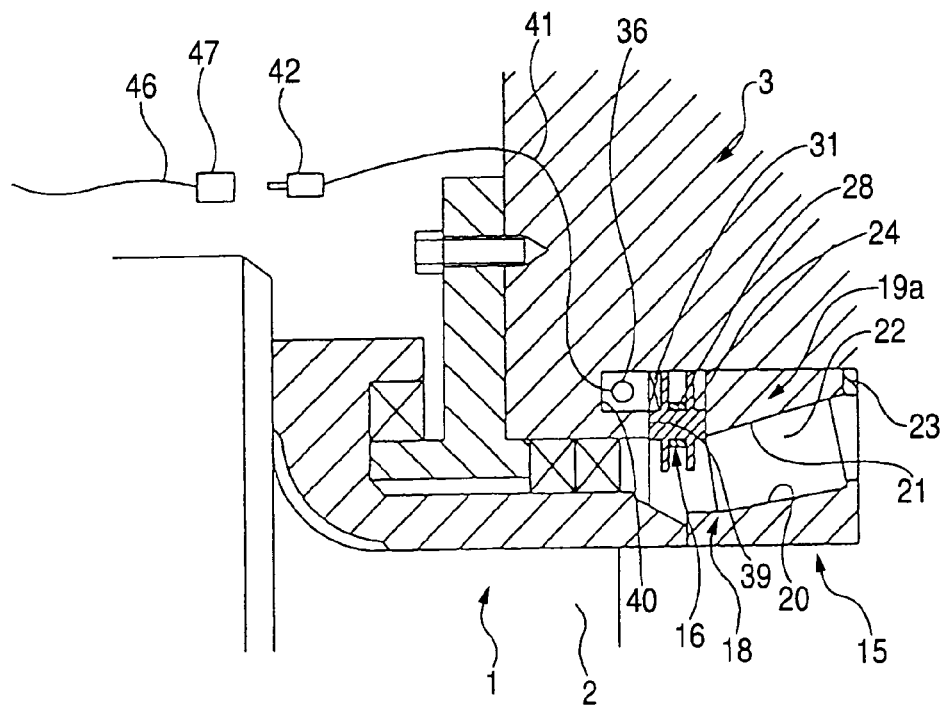
FIG. 3 is an enlarged sectional view of a portion B of FIG. 1.
Figure 4:
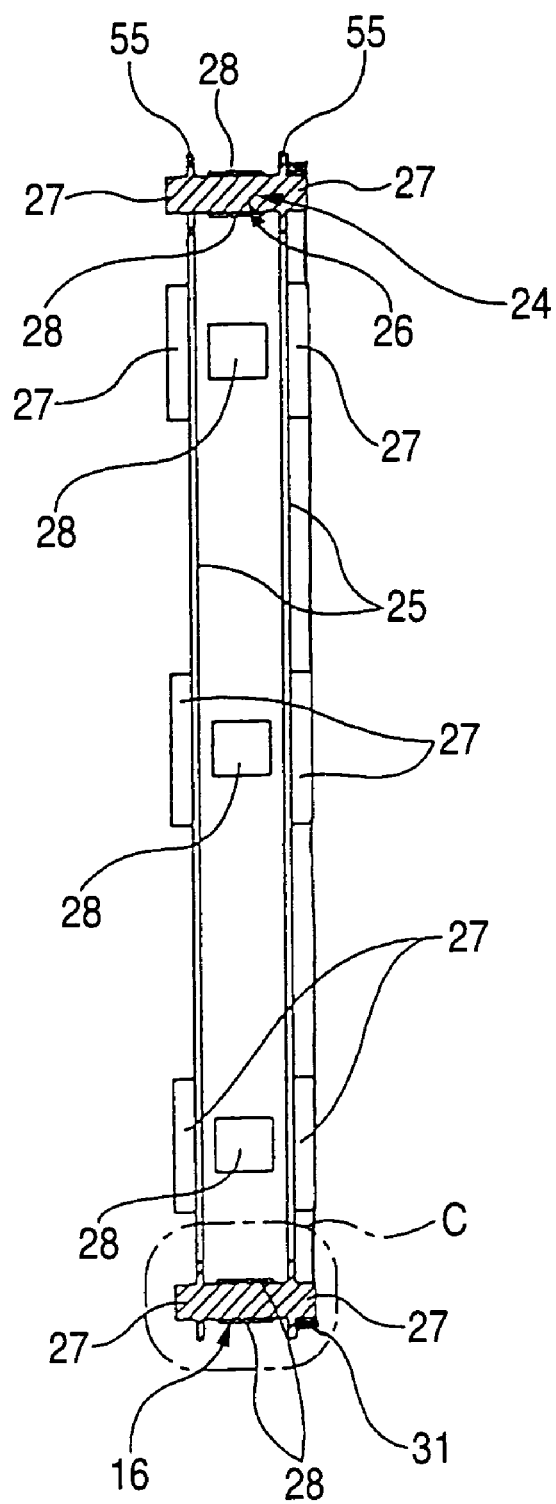
FIG. 4 is an enlarged sectional view showing only a supporting member supporting a sensor device of FIG. 1.
Figure 5:
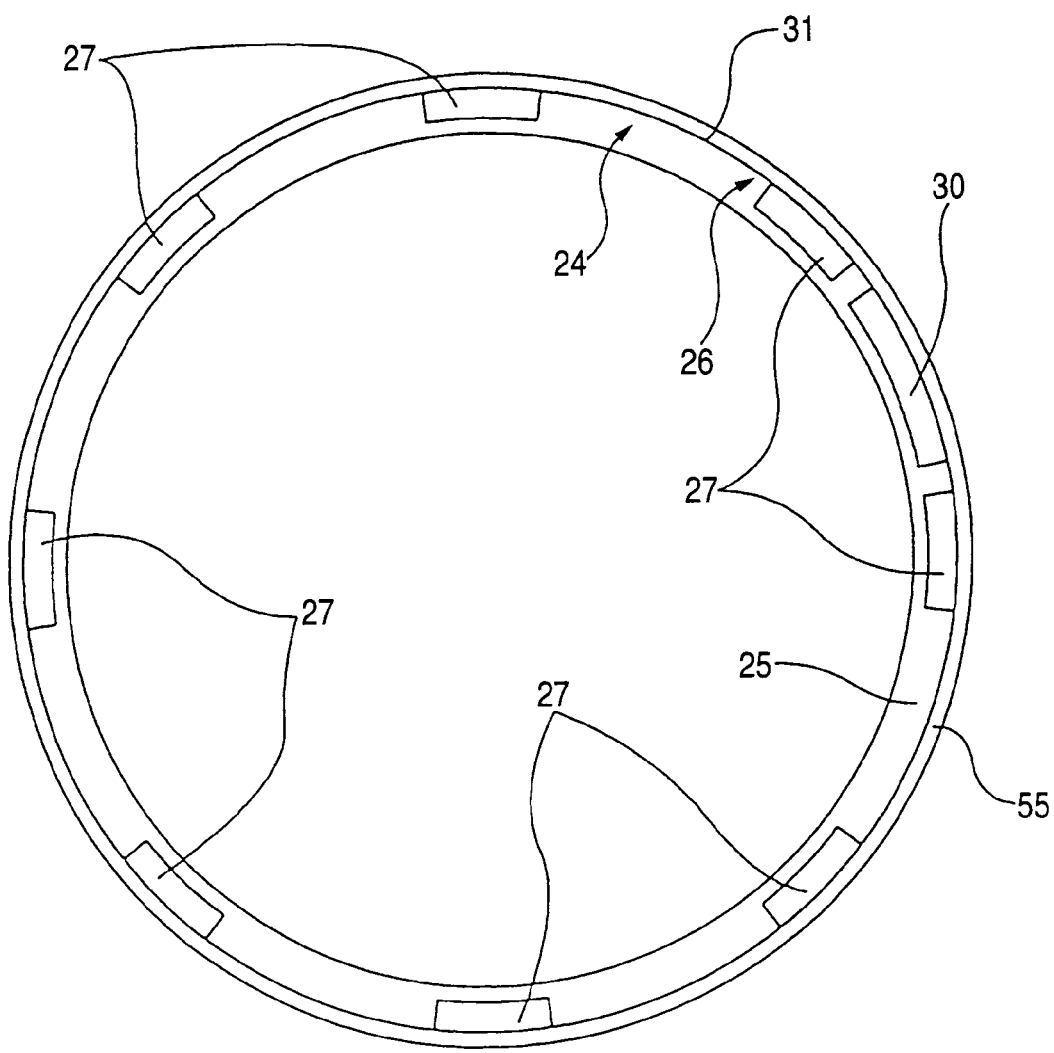
FIG. 5 is a diagram viewed from a side of FIG. 4.
Figure 6:
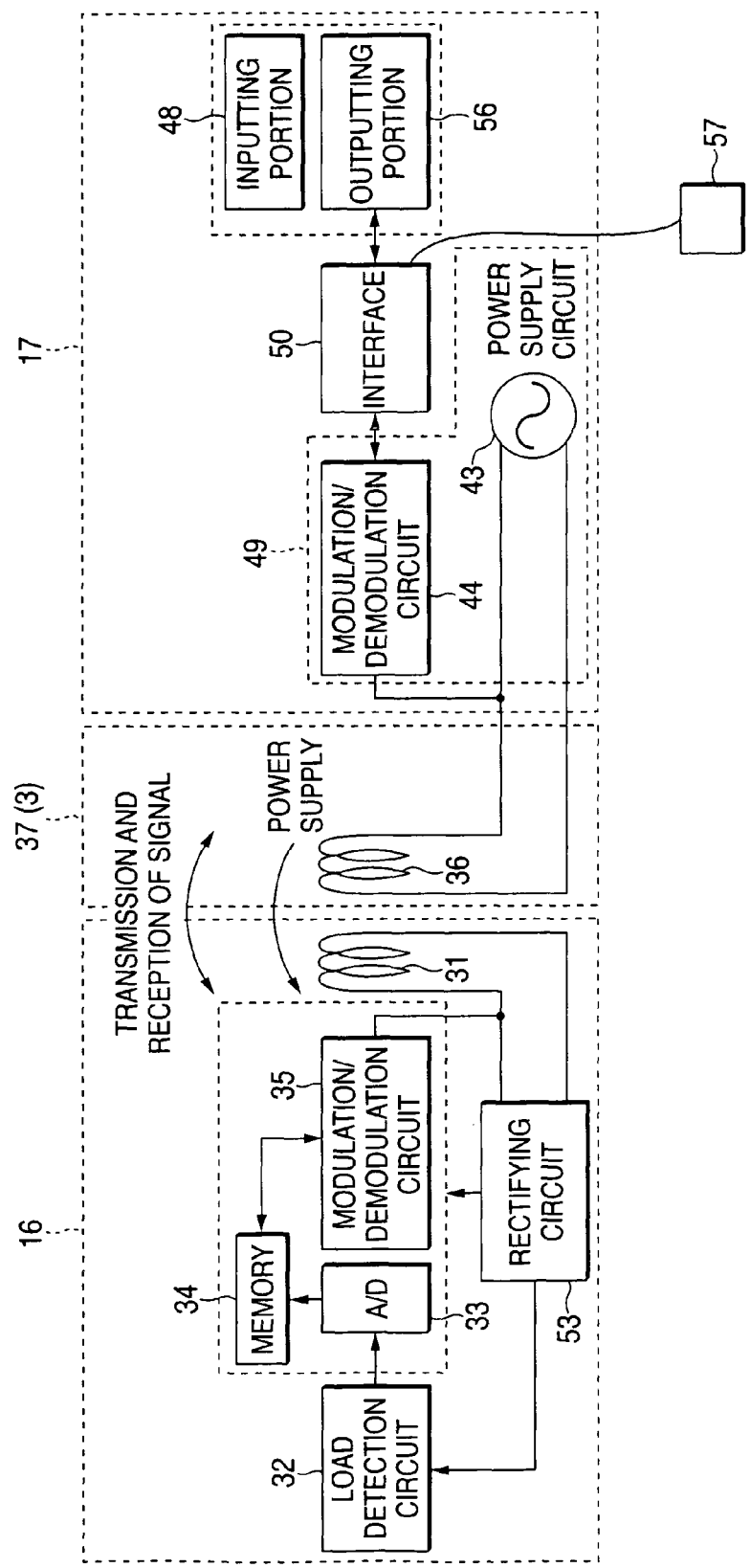
FIG. 6 is a block diagram showing the rolling bearing unit with the sensor device of the first embodiment.

FIGS. 1 to 7 each show a rolling bearing unit with a sensor device according to a first embodiment of the present invention. In the first embodiment, a rolling bearing unit 14 with a sensor device is incorporated in a rotary supporting portion on both axial ends of a rolling roller 1 in a rolling mill for rolling a metallic material such as steel. In some detail, a roll neck 2 is provided in the central portion on the both axial ends of the rolling roller 1, and rotatably supported by a four-row tapered roller bearing 15 inside a housing 3 which does not rotate even during use. The rolling bearing unit 14 comprises the four-row tapered roller bearing 15, the pair of sensor devices 16, 16, a pair of second coils 36, 36 and an external inputting/outputting device 17 (FIG. 6). The four-row tapered roller bearing 15 comprises a pair of inner rings 18, 18, three outer rings 19a, 19b, conical convex inner ring raceways 20, 20, conical concave outer ring raceways 21, 21, and a plurality of tapered rollers 22, 22. The inner rings 18, 18 are fitted on and fixed to the roll neck 2. The three outer rings 19a, 19b are fitted in and fixed to the housing 3. The conical convex inner ring raceways 20, 20 are provided on the outer surface of the inner rings 18, 18. The conical concave outer ring raceways 21, 21 are provided on the inner surface of the outer rings 19a, 19b. The plurality of tapered rollers 22, 22 are provided rotatably interposed between the inner ring raceways 20, 20 and the outer ring raceways 21, 21 as rolling elements.

An outer ring spacer 23 is provided between the adjacent outer rings 19a and 19b and an inner ring spacer 45 is provided between a pair of adjacent inner rings 18 and 18. A pair of supporting members 24, 24 are each fitted in and supported by the inner surface of the housing 3 at the positions outside the both axial ends of the three adjacent outer rings 19a, 19b and the two outer ring spacers 23, 23. These supporting members 24 each comprise an annularly formed main body 26 and arc protrusions 27, 27 as shown in detail in FIGS. 4 and 5. The protrusions 27, 27 protrude in the axial direction of the main body 26. The protrusions 27, 27 also are provided at a plurality of circumferential positions (8 positions as viewed on the drawing) on the both axial ends of the main body 26 in such an arrangement that the circumferential phases of the protrusions disposed on the both axial ends of the main body 26 coincide with each other. Further, the main body 26 has inner annular wall portions 25, 25 and outer annular wall portions 55, 55, which radially protrude and disposed on the both axial ends of the main body 26 respectively. According to the first embodiment of the present invention, the various parts such as protrusions 27, 27, inner annular wall portions 25, 25, and outer annular wall portions 55, 55 of the supporting members 24, 24 are integrally formed by subjecting an annular metallic material to work such as cutting. At finishing the surface of the forward end of the protrusions 27, 27, the plurality of protrusions 27, 27 positioned on the same axial side are preferably worked at the same time.

Further, the sensor devices 16, 16 are each supported by a part of the supporting members 24, 24. These sensor devices 16, 16 each comprise a plurality of distortion gauges 28, 28 which are detecting portions, a substrate 30 (as shown in FIG. 5), and a first coil 31. The distortion gauges 28, 28 are supported at an axially middle portion on both the inner and outer surfaces of the main body 26 where they coincide with the protrusions 27, 27 in circumferential phase. The distortion gauges 28, 28 each can detect the axial distortion of the main body 26. The substrate 30 is fixed to one of the both axial ends of the main body 26 which is opposite to the both ends of the housing 3 (front side as viewed on FIG. 5). The substrate 30 is disposed at a position deviated in circumferential phase from the protrusions 27, 27 as shown in FIG. 5. The first coil 31 is wound round the periphery of the plurality of protrusions 27, 27 outside one (right one as viewed on FIG. 4) of the pair of outer annular wall portions 55, 55 on the side where the substrate 30 is provided (right side as viewed on FIG. 4 or front side as viewed on FIG. 5). Alternatively, the substrate 30 may be disposed at a position different from the distortion gauges 28, 28 between the inner annular wall portions 25, 25 (or the outer annular wall portions 55, 55) on the inner surface (or outer surface) of the main body 26.

Figure 7:
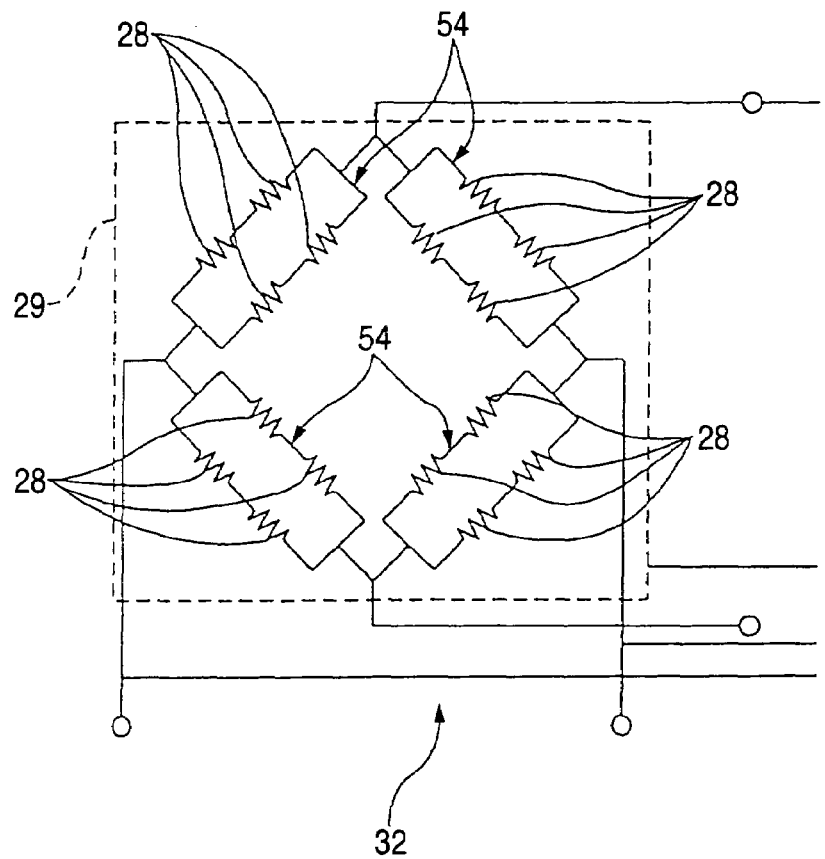
FIG. 7 is a diagram showing a bridge circuit constituting a load detection circuit.

The distortion gauges 28, 28 are combined with each other to form a bridge circuit 29 as shown in FIG. 7. The bridge circuit 29 and a load conversion circuit (not shown) connected thereto form a load detection circuit 32. The load conversion circuit determines the average value of distortion detected by the distortion gauges 28, 28 on the basis of a voltage signal outputted from the bridge circuit 29, and then converts the average value to a signal representing the load (analog signal)

The bridge circuit 29 shown in FIG. 7 is formed by distortion gauges 28, 28 supported by the both inner and outer surfaces of the main body 26 at eight circumferential positions, totaling 16 circumferential positions. Among these distortion gauges 28, 28, a pair of distortion gauges 28, 28 disposed on the inner and outer surfaces at the positions where their phases with regard to the circumferential direction of the main body 26 are substantial coincidence with each other are connected to each other in series. Further, a pair of distortion gauges 28, 28 disposed radially opposed thereto are connected in parallel. In this arrangement, four sets of circuit elements 54, 54 are provided. These circuit elements 54, 54 form the bridge circuit 29. The constitution and operation of other portions of the bridge circuit 29 are similar to that of known bridge circuits and will not be described in detail.

The substrate 30 comprises the load conversion circuit portion of the load detection circuit 32, an A/D converter 33, a memory 34, a modulation/demodulation circuit 35 and a rectifying circuit 53 (FIG. 6). The A/D converter 33 converts the analog signal representing the detected value of load from the load detection circuit 32 to a digital signal. The memory 34 records the digital signal and data from an external inputting/outputting device 17 described later. The modulation/demodulation circuit 35 converts the digital signal read from the memory 34 to a frequency signal (modulation signal) and then combines the modulation signal and a carrier wave to produce a modulated wave. The modulation/demodulation circuit 35 also takes a frequency signal (modulation signal) out of the modulated signal sent through the second coil 36 and first coil 31. The first coil 31 can transmit the modulated signal composed by the modulation/demodulation circuit 35 to the second coil 36 described later. The rectifying circuit 53 converts an alternating voltage induced on the first coil 31 by the second coil 36 to a D.C. voltage. The electric power which has thus been converted to D.C. (direct current) is then supplied into the load detection circuit 32, the A/D converter 33, the memory 34 and the modulation/demodulation circuit 35. In the first embodiment, the first coil 31 and the modulation/demodulation circuit 35 form the transmitting device.

The pair of supporting members 24, 24 by which the sensor device 16 having the aforementioned constitution is supported are fitted in the space on the both axial ends of the combination of the three outer rings 19a, 19b and two spacers 23, 23 on the inner surface of the housing 3 so that they are supported by the inner surface of the housing 3. The housing 3 has a holding lid 37 connected and fixed to the axial end thereof (right end as viewed on FIGS. 1 and 2) with a plurality of bolts 38. The outer rings 19a, 19b, the spacers 23, 23 and the supporting members 24, 24 are disposed interposed between an axial inner side (left side as viewed on FIGS. 1 and 2) of the holding lid 37 and a step 39 provided on the inner surface of the axial inner end of the housing 3. In this arrangement, the forward ends of the protrusions 27, 27 provided on the both axial ends of one of the pair of supporting members 24, 24 disposed axially outside the other (right side as viewed on FIG. 1) are butted to the end of the small diameter side of one of the outer rings 19a, 19b disposed outermost (right side as viewed on FIG. 1) and the holding lid 37 at the position close to the inner diameter portion on the inner surface thereof, respectively. In this arrangement, the forward ends of the protrusions 27, 27 provided on the both axial ends of one of the pair of supporting members 24, 24 disposed axially inside the other (left side as viewed on FIG. 1) are butted to the end of the small diameter side of one of the outer rings 19a, 19b disposed innermost (left side as viewed on FIG. 1) and the step 39 disposed on the axial inner end of the housing 3, respectively.

The second coils 36, 36 are disposed on the holding lid 37 at the position close to the inner diameter portion on the axial inner side thereof and on the step 39 provided on the axial inner end of the housing 3, respectively. Retaining concave grooves 40, 40 are formed over all circumference of the holding lid 37 at the position close to the inner diameter portion on the axial inner side thereof and the step 39, respectively, in the first embodiment. The second coils 36, 36 are accommodated in the retaining concave grooves 40, 40, respectively. In this arrangement, the second coils 36, 36 and the first coils 31, 31 are disposed concentric with each other and opposed to each other with a minute clearance interposed there between. One end of harnesses 41, 41 passing through the holding lid 37 or the housing 3 are connected to the second coils 36, 36, respectively. To the other end of the harnesses 41, 41 are connected male connectors 42, 42, respectively.

The external inputting/outputting device 17 (FIG. 6) is disposed outside the housing 3. A pair of cables 46, 46 have female connectors 47, 47, respectively at one end thereof and are each connected to the external inputting/outputting device 17 at the other end thereof. The female connectors 47, 47 can connect to the male connectors 42, 42, respectively. The external inputting/outputting device 17 comprises an inputting portion 48, an outputting portion 56, a control section 49 and an interface 50 as shown in FIG. 6. The inputting portion 48 is used for inputting data representing the matter to be managed with regard to the four-row tapered roller bearing 15 and the sensor devices 16, 16. The outputting portion 56 outputs data read from the memory 34. The interface 50 connects the inputting portion 48 and outputting portion 56 to the control section 49. The control section 49 comprises a power supply circuit 43 and a modulation/demodulation circuit 44. The power supply circuit 43 applies an alternating voltage to the second coil 36.

The modulation/demodulation circuit 44 has a function of taking a frequency signal (modulation signal) out of the modulated wave sent through the first and second coils 31, 36 and a function of combining the signal representing data sent from the inputting portion 48 with a carrier wave to produce a modulated wave. In the first embodiment, the second coil 36 and the modulation/demodulation circuit 44 form the receiving device.

In the above-mentioned arrangement, firstly, the four-row tapered roller bearing 15 and the supporting members 24, 24 by which the sensor devices 16, 16 are supported, respectively, are attached in the clearance between the housing 3 and the roll neck 2. Then, the female connectors 47, 47 provided at the end of the cables 46, 46 extending from the external inputting/outputting device 17 is connected to the male connectors 42, 42 provided at the end of the harness 41 extending from the axially outer surface of the holding lid 37 and the axial inner end of the housing 3. Data representing the matter to be managed with regard to the four-row tapered roller bearing 15 such as identification number, operation starting time, mounting position and bearing precision of the four-row tapered roller bearing 15, and number of the housing 3 and rolling roller 1 is inputted by the inputting portion 48 provided in the external inputting/outputting device 17 in the vicinity of the four-row tapered roller bearing 15. The data thus inputted is sent through the first and second coils 31, 36 to the sensor devices 16, 16 where it is then recorded in the memory 34 provided therein. In the memory 34 is also recorded data representing on which side of the four-row tapered roller bearing 15 the sensor device 16 is disposed.

In operation, when the operator outputs the detected value of load on the four-row tapered roller bearing 15 to the outputting portion 56 of the external inputting/outputting device 17, the instruction such that the data is outputted to the outputting portion 56 is inputted to the inputting portion 48 of the external inputting/outputting device 17. The signal which has been read from the memory 34 of the sensor devices 16, 16 on the basis of the input is then transmitted to the external inputting/outputting device 17 through the first and second coils 31, 36, respectively, to output the above-mentioned data and the detected value of load to the outputting portion 56 of the external inputting/outputting device 17.

According to the rolling bearing unit with the sensor device of the present invention having the aforementioned constitution, the operator can confirm the detected value of load read from the load detection circuit 32 of the sensor devices 16, 16 through the memory 34 at the outputting portion 56 of the external inputting/outputting device 17. Therefore, the operator can easily judge how much the rolling mill is deteriorated. Further, by allowing a rolling mill operation controller 57 (FIG. 6) to adjust the load imposed axially on the rolling roller 1 depending on the detected value of load, the load imposed axially on the four-row tapered roller bearing 15 can be adjusted to a proper value, making it possible to prolong the life of the four-row tapered roller bearing 15.

Further, according to the first embodiment, wireless communications are made between the first and second coils 31, 36 to take a signal out of the sensor devices 16, 16 supported by the supporting members 24, 24 and send it to the external inputting/outputting device 17. Accordingly, it is not necessary that the harness 41 or cable 46 be connected even to the sensor devices 16, 16. In this arrangement, the total length of these harnesses 41 or cables 46 can be reduced. Further, these harnesses 41 or cables 46 cannot interfere in the replacement of the rolling roller 1 or four-row tapered roller bearing 15. Thus, the replacement of these parts can be easily conducted.

Moreover, according to the first embodiment, the female connectors 47, 47 provided at the end of the cables 46, 46 extending from the external inputting/outputting device 17 can be detached from the male connectors 42, 42 provided at the end of the harness 41 extending from a part of the holding lid 37 and the inner surface of the housing 3, respectively. In this arrangement, even when the cables 46, 46 are long, the female connectors 47, 47 may be merely detached from the male connectors 42, 42, respectively, to prevent the cables 46, 46 from interfering in the replacement of the rolling roller 1 or four-row tapered roller bearing 15. Thus, the replacement of these parts can be more easily conducted.

Further, since it is not necessary that the harnesses 41 or cables 46 be connected even to the sensor devices 16, 16, the breaking of the harnesses 41 or cables 46 can be prevented even when the supporting members 24, 24 by which the sensor devices 16, 16 are supported rotate relative to the housing 3.

Further, according to the first embodiment, the supporting members 24, 24 each has various parts such as protrusions 27, 27 etc., integrally formed by working a metallic material. Unlike the related art structure previously mentioned, the supporting members 24, 24 having the aforementioned constitution do not require that a plurality of members as separate bodies be combined with a screw or the like. In this arrangement, the production of the rolling bearing unit 14 with the sensor device can be simplified.

In order to enhance the detecting precision of the sensor devices 16, 16, it is necessary that the side faces provided at a part of the supporting members 24, 24 for butting to the mating member disposed axially opposed to the supporting members 24, 24 be substantially positioned on the same virtual plane extending perpendicular to the central axis of the supporting members 24, 24. According to the first embodiment, the side faces correspond to the forward end of the plurality of protrusions 27, 27 provided on the supporting members 24, 24. Contrary to the related art structure, the supporting members 24, 24 according to the first embodiment each have various parts integrally formed by working a metallic material. In this arrangement, the forward end of the protrusions 27, 27 provided on the same axial side of the supporting members 24, 24 can be together positioned substantially on the same virtual plane extending perpendicular to the central axis of the supporting members 24, 24 without the necessity of troublesome assembly. In this arrangement, the detecting precision of the sensor devices 16, 16 can be enhanced while preventing cost rise.

Further, according to the first embodiment, the supporting members 24, 24 each comprise an annularly formed main body 26 and arc protrusions 27, 27 provided axially protruding at a plurality of circumferential positions on the both axial ends of the main body 26 in such an arrangement that the circumferential phases of the protrusions 27, 27 disposed on the both axial ends of the main body 26 coincide with each other. The distortion gauges 28, 28 constituting the sensor devices 16, 16 are supported by the axially middle portion where they coincide with the protrusions 27, 27 in circumferential phase on both the inner and outer surfaces of the main body 26. In this arrangement, a plurality of protrusions 27, 27 for butting to the mating member disposed axially opposed to the supporting members 24, 24 can be provided at the positions where their phases with regard to the circumferential direction of the main body 26 are substantial coincidence with those of the distortion gauges 28, 28. Accordingly, the precision in detection of the load axially imposed on the four-row tapered roller bearing 15 can be enhanced.

Moreover, according to the first embodiment, the area of the forward end of the plurality of protrusions 27, 27, which are subject to axial load imposed by the mating member, among the parts of the supporting members 24, 24 can be reduced. In this arrangement, the deformation of the plurality of circumferential positions on the main body 26 supporting the distortion gauges 28, 28 against the load imposed by the mating member can be raised. Accordingly, the detecting precision of the sensor devices 16, 16 can be made greater than in the case where the both axial ends of the supporting members 24, 24 each are a mere flat area free of protrusions 27, 27. In the first embodiment, the supporting members 24, 24 have inner annular walls 25, 25 and outer annular walls 55, 55 provided on the both axial ends of the inner and outer surfaces thereof, respectively. In this arrangement, the distortion gauges 28, 28 disposed between the annular walls 25, 25 can be prevented from coming in contact with and being damaged by the inner surface of the housing 3 or the outer surface of the member disposed opposed to the inner side of the supporting members 24, 24.

Further, according to the first embodiment, the electric power is supplied into the sensor devices 16, 16 through the first and second coils 31, 36, making it possible to eliminate the necessity of using a battery as a power supply for operating the various portions of the sensor devices 16, 16. Accordingly, the necessity of effecting troublesome operation such as removal of the supporting members 24, 24 from the housing 3 in case of battery consumption can be eliminated, making it possible to reduce operational cost.

Moreover, according to the first embodiment, the sensor devices 16, 16 each comprise the memory 34 which can record the detected value of load outputted from the load detection circuit 32 and data representing the matter to be managed with regard to the four-row tapered roller bearing 15 and the sensor devices 16, 16. In this arrangement, the matter to be managed with regard to the four-row tapered roller bearing 15 and the sensor devices 16, 16, e.g., identification number and operation starting time of the four-row tapered roller bearing 15 and position of the sensor devices 16, 16 can be easily confirmed. In the first embodiment, in addition to the identification number of the four-row tapered roller bearing 15, etc., the load imposed on the supporting members 24, 24 can be outputted to the outputting portion 56 of the external inputting/outputting device 17. Accordingly, even when the rolling mill is provided with a plurality of rolling bearings, the results which have been outputted to the outputting portion 56 can be easily confirmed relating to the four-row tapered roller bearing 15. Moreover, in the first embodiment, the external inputting/outputting device 17 can be used to record data representing the matter to be managed with regard to the four-row tapered roller bearing 15 and the sensor devices 16, 16 in the memory 34. In this arrangement, the operator can record the aforementioned data in the vicinity of the place where the four-row tapered roller bearing 15 is incorporated in the machine substantially at the same time with the incorporation. Accordingly, unlike the case where the recording of data is conducted in a place remote from the place of incorporation, the first embodiment can prevent any failure in the recording of data and facilitate the recording of data.

According to the first embodiment, the electric power is supplied into the various portions of the sensor device 16 through the first and second coils 31, 36. Accordingly, it is necessary that the harness 41 connected to the second coil 36 and the cable 46 extending from the external inputting/outputting device 17 be kept connected to each other. However, when a battery is provided inside the sensor devices 16, the harness 41 and the cable 46 should be connected to each other only when at least one of the data representing the matter to be managed with regard to the detected value of load and the four-row tapered roller bearing 15 and sensor devices 16 is outputted.

While the first embodiment comprises protrusions 27, 27 provided on the both axial ends of the supporting members 24, 24 at eight circumferential positions, these protrusions 27, 27 may be provided on the both axial ends of the supporting members 24, 24 at two or more circumferential positions. However, in this case, it is preferred from the standpoint of enhancement of the detecting precision of the sensor devices 16, 16 that these protrusions 27, 27 be provided at circumferentially regular intervals on the supporting members 24, 24 and the distortion gauges 28 be provided at positions where their circumferential phases coincide with those of these protrusions 27, 27. Further, in the case where number of the distortion gauges 28, 28 provided on the supporting members 24, 24 is not 16, the configuration of the bridge circuit formed by these distortion gauges 28, 28 is designed properly different from that shown in FIG. 7. Moreover, the shape of the section of these protrusions 27, 27 is not limited to arc as in the first embodiment but may be any other shape such as rectangle and circle. In any case, however, it is preferred from the standpoint of enhancement of the detecting precision of the sensor devices 16, 16 that the shape and sectional area of the protrusions 27, 27 be the same from one protrusion to another.

The four-row tapered roller bearing 15 may have a sealing structure (not shown) provided on the both ends thereof to hermetically seal the interior of the four-row tapered roller bearing 15. Alternatively, the four-row tapered roller bearing 15 may have the pair of outer rings 19a, 19a among the outer rings 19a, 19b constituting the four-row tapered roller bearing 15, which are provided close to the both ends thereof, may have a seal ring fixed to the end of the inner diameter portion. In the case where such a sealing structure or seal ring is provided, even when the holding lid 37 is removed from the housing 3, the interior of the four-row tapered roller bearing 15 can be hermetically sealed to prevent the leakage of the grease from the interior of the four-row tapered roller bearing 15. Further, a temperature sensor (not shown) for detecting the temperature of the four-row tapered roller bearing 15 may be provided. In the case where such a temperature sensor is provided, the temperature data detected by the temperature sensor and the distortion data detected by the sensor devices 16, 16 can be used to allow the load detection circuit 32 (FIGS. 6 and 7) to determine the load imposed on the four-row tapered roller bearing 15 with a higher precision (such that the measurements of load can be corrected by temperature data). The temperature sensor may be provided on the supporting members 24, 24. Further, it can be arranged such that data representing the detected value from the temperature sensor can be recorded in the memory 34 of the sensor devices 16, 16 and can be outputted from the external inputting/outputting device 17.

Figure 8:
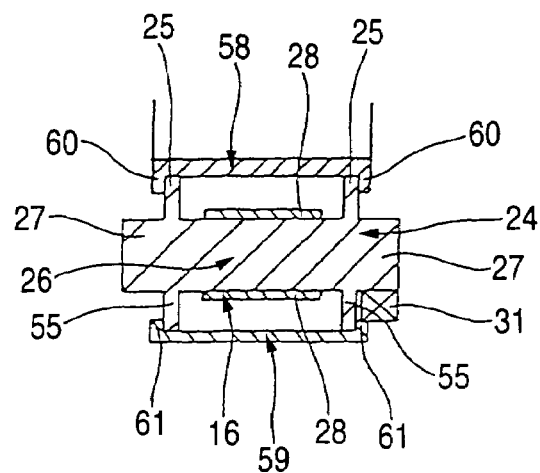
FIG. 8 is an enlarged sectional view of a portion C of FIG. 4 shown with the supporting member provided with both inner and outer covers.

As shown in FIG. 8, the supporting member 24 may have an inner cover 58 and an outer cover 59 provided on the inner surface and the outer surface thereof, respectively. The inner cover 58 is a cylinder formed by a synthetic resin, soft steel or the like and has outward collars 60, 60 formed on the outer surface of the both axial ends thereof, respectively. The inner cover 58 is fitted in the inner wall portions 25, 25 provided on the inner surface of the supporting member 24. Further, the inner wall portions 25, 25 are engaged with the outward collars 60, 60, respectively. In this arrangement, the inner cover 58 is supported by the supporting member 24. The outer cover 59, is a cylinder formed by a synthetic resin, soft steel or the like and has inward collars 61, 61 formed on the inner surface of the both axial ends thereof, respectively. The outer cover 59 is fitted on the outer annular wall portions 55, 55 provided on the outer surface of the supporting member 24. Further, the inward collars 61, 61 are engaged with the outer annular walls 55, 55, respectively. In this arrangement, the outer cover 59 is supported by the supporting member 24. In the case where the supporting member 24 has the inner and outer covers 58 and 59 provided thereon, the damage of the plurality of distortion gauges 28, 28 supported by the supporting member 24 can be more effectively prevented.

Figure 9:
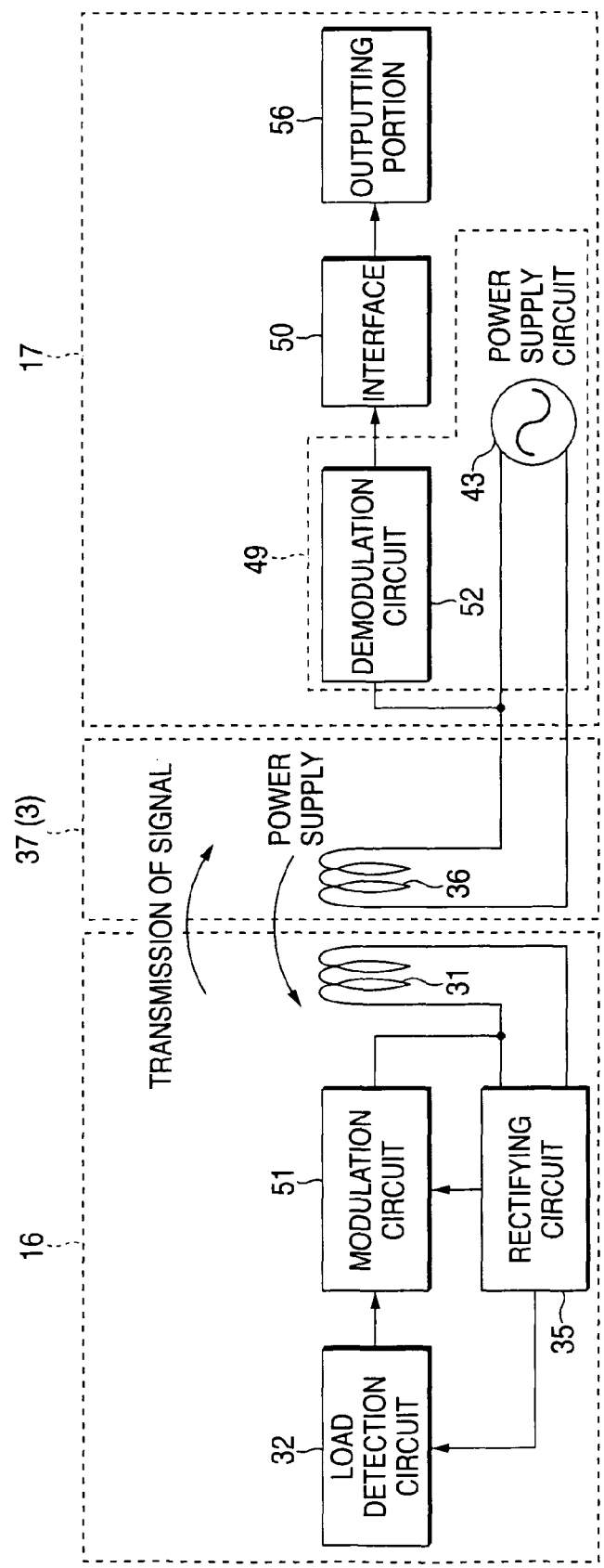
FIG. 9 is a block diagram showing a rolling bearing unit with a sensor device according to a second embodiment of the present invention.

FIG. 9 illustrates a second embodiment of the present invention. Unlike the first embodiment, the present embodiment has no A/D converter 33, modulation/demodulation circuit 35, memory 34 and inputting portion 48 (see FIG. 6) provided in the sensor device 16 and the external inputting/outputting device 17. Instead, the second embodiment comprises a modulation circuit 51 provided in the sensor devices 16 as well as a demodulation circuit 52 provided in the external inputting/outputting device 17. The modulation circuit 51 converts the signal representing load outputted from the load detection circuit 32 provided in the sensor devices 16 to a modulation signal and combine it with a carrier wave to produce a modulated wave. The demodulation circuit 52 takes the modulation signal out of the modulated wave transmitted to the external inputting/outputting device 17 through the first coil 31 provided on the sensor device 16 and the second coil 36 provided on the external inputting/outputting device 17.

Unlike the first embodiment, the second embodiment does not allow the first coil 31 to receive a wireless signal. Further, the second coil 36 does not transmit a wireless signal. In the second embodiment, the modulation circuit 51 and the first coil 31 form the transmitting device and the demodulation circuit 52 and the second coil 36 form the receiving device.

Unlike the first embodiment, the rolling bearing unit with the sensor device according to the second embodiment has no memory 34 provided in the sensor devices 16. In this arrangement, the rolling bearing unit with the sensor device can neither record data representing the matter to be managed with regard to the four-row tapered roller bearing 15 and the sensor devices 16 in the memory 34 nor output data recorded in the memory 34 to the outputting portion 56. However, in the second embodiment, the number of parts can be less than in the first embodiment, making it possible to reduce the cost easily.

The other structures and operation of the second embodiment are similar to that of the first embodiment and will not be described below.

Figure 10:
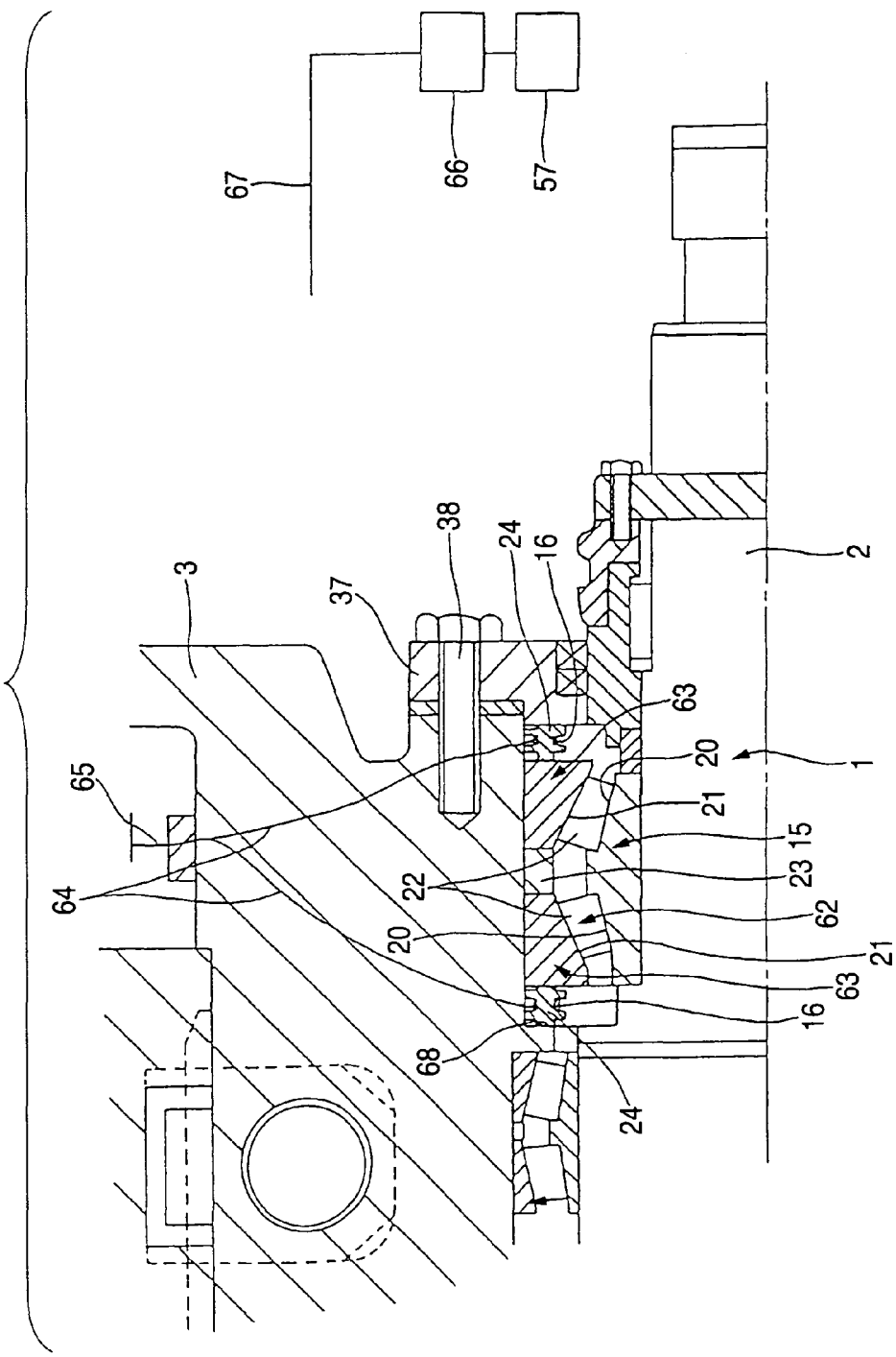
FIG. 10 is a half-sectional view showing a rolling bearing unit with a sensor device according to a third embodiment of the present invention.

FIG. 10 illustrates a third embodiment of the present invention. In the third embodiment, a double-row tapered roller bearing 62 is provided to bear the axial ends of the rolling roller 1 rotatably relative to the housing 3. The double-row tapered roller bearing 62 comprises a pair of outer rings 63, 63, an outer ring spacer 23, an inner ring 15 and a plurality of tapered rollers 22, 22 which each are rolling elements. The pair of outer rings 63, 63 and the outer ring spacer 23 are fitted in and fixed to the axial end of the housing 3. The inner ring 15 is fitted on and fixed to the axial end of the rolling roller 1. The plurality of tapered rollers 22, 22 are disposed interposed between conical convex inner ring raceways 20, 20 provided on the outer surface of the inner ring 15 and conical concave outer ring raceways 21, 21 provided on the inner surface of the outer rings 63, 63, respectively. A pair of supporting members 24, 24 are fitted in the space disposed on the both axial ends of the pair of outer rings 63, 63 and the outer ring spacer 23 disposed in combination on the inner surface of the housing 3 so that they are supported by the housing 3. Among the parts of the supporting members 24, 24, the supporting member 24 disposed outside the other (right side as viewed on FIG. 10) is disposed interposed between the inner side of the holding lid 37 fixed to the outer end of the housing 3 and the end of one of the pair of outer rings 63, 63 disposed outside the other. Among the supporting members 24, 24, the supporting member 24 disposed inside the other (left side as viewed on FIG. 10) is disposed interposed between a step 68 provided on the inner surface of the end of the housing 3 and the end of one of the pair of outer rings 63, 63 disposed inside the other.

In particular, unlike the second embodiment shown in FIG. 9, the third embodiment has no first coil 31, rectifying circuit 35 and load detection circuit 32 (see FIG. 9) provided in the sensor devices 16, 16 provided in the supporting members 24, 24. Instead, the third embodiment comprises a distortion detection circuit (not shown) for determining the average value from the detected value of distortion of the supporting members 24, 24 from a plurality of distortion gauges and an electric power (not shown). The end of harnesses 64, 64 extending through the interior of the housing 3 and connected to a modulation circuit 51 (see FIG. 9) provided in the sensor devices 16, 16 each are connected to a first antenna 65 fixed to the outer surface of the housing 3. A wireless signal representing distortion detected by the distortion detection circuit can be transmitted from the first antenna 65. In the third embodiment, the first antenna 65 and the modulation circuit 51 provided in the sensor devices 16, 16 form the transmitting device.

Disposed outside the housing 3 are a receiving device 66 and a rolling mill operation controller 57. The receiving device 66 comprises a second antenna 67, a demodulation circuit 52 (see FIG. 9) and an interface portion 50 (see FIG. 9). The second antenna 67 receives a wireless signal representing the detected value (average value) of distortion transmitted by the first antenna 65. The demodulation circuit 52 and the rolling mill operation controller 57 are connected to each other with the interface portion 50. The rolling mill operation controller 57 converts the detected value of distortion represented by the signal transmitted by the sensor devices 16, 16 via the first and second antennas 65, 67 to the load imposed axially on the double-row tapered roller bearing 62 always since the moment when the power supply is switched ON. Further, the rolling mill operation controller 57 adjusts the load imposed axially on the rolling roller 1 depending on the load thus determined.

In the third embodiment having the aforementioned constitution, the end of the harnesses 64, 64 connected to the sensor devices 16, 16 supported by the supporting members 24, 24 and extending through the interior of the housing 3 are connected to the first antenna 65 fixed to the exterior of the housing 3. In this arrangement, the replacement of the tapered roller 62 or rolling roller 1 becomes more troublesome than in the aforementioned embodiments. If the supporting members 24, 24 are rotated relative to the housing 3, the possibility such that the harnesses 64, 64 do not break is less than the aforementioned embodiments. In the third embodiment, however, wireless communications are conducted between the first and second antennas 65, 67 to take a signal representing distortion out of the sensor devices 16, 16 and transmit it to the receiving device 66. In this arrangement, it is not necessary that the sensor devices 16, 16 supported by the supporting members 24, 24 and the receiving device 66 be connected to each other with a long harness. Accordingly, the replacement of these parts can be more easily conducted than in the related art structure having the sensor devices 16, 16 connected to external devices with a long harness.

The other structures and operation of the third embodiment are similar to that of the second embodiment shown in FIG. 9 and will not be described below.

In the aforementioned embodiments, the four-row tapered roller bearing 15 or double-row tapered roller bearing 62 may be replaced by other types of rolling bearing such as cylindrical roller bearing, ball bearing and combination of cylindrical roller bearing and tapered roller bearing. While the embodiments have been described with reference to the case where a pair of supporting members 24, 24 supporting the sensor device 16 are provided on the both ends of the four-row tapered roller bearing 15, respectively, one supporting member 24 supporting the sensor device 16 may be disposed interposed between the fixed rings constituting the pair of rolling bearings. In this case, considerations such as provision of an additional sensor are needed to confirm in which direction load is imposed on the pair of rolling bearings. However, even when no such an additional sensor is provided, the magnitude of the load can be detected.

Figure 11:
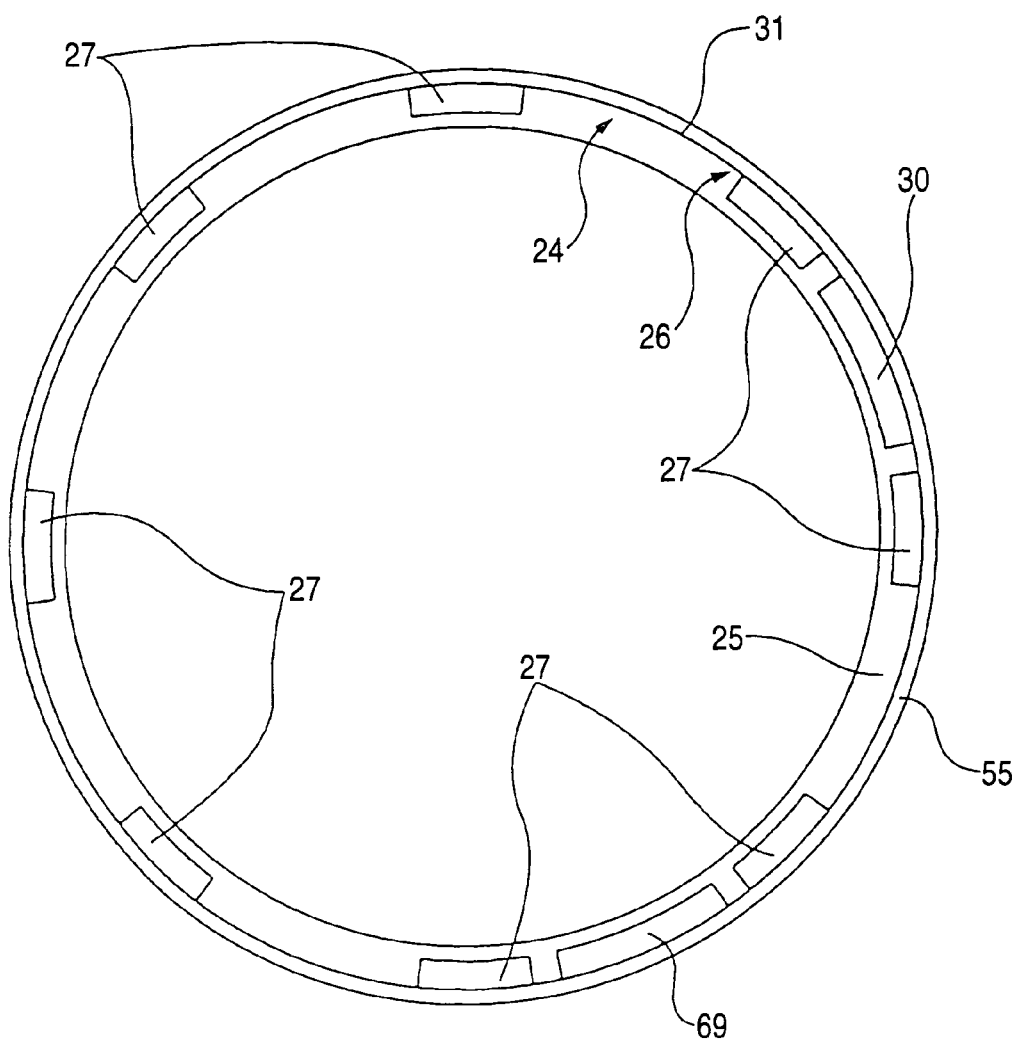
FIG. 11 is a side view showing a supporting member of a rolling device with a sensor device according to a fourth embodiment of the present invention.
Figure 12:
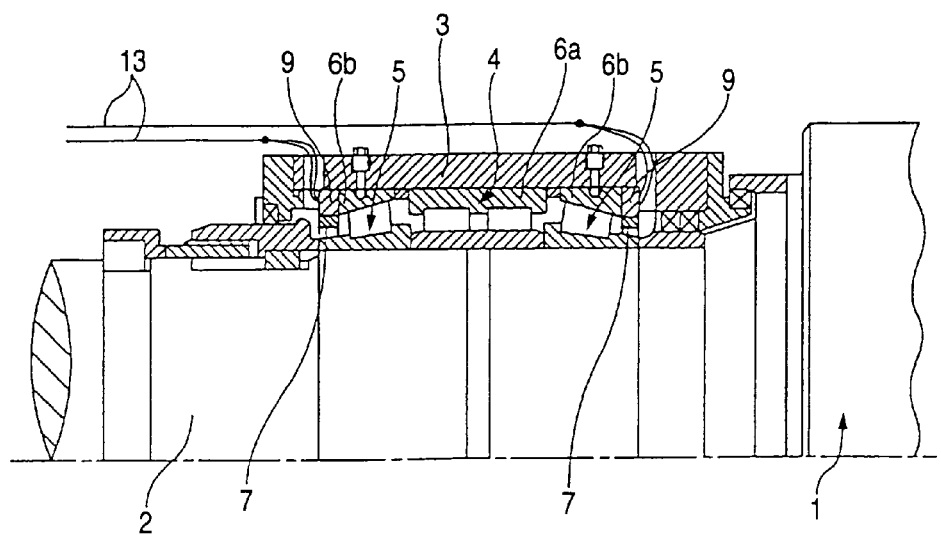
FIG. 12 is a half-sectional view showing an example of a rolling bearing with a sensor device of the related art structure.
Figure 13:
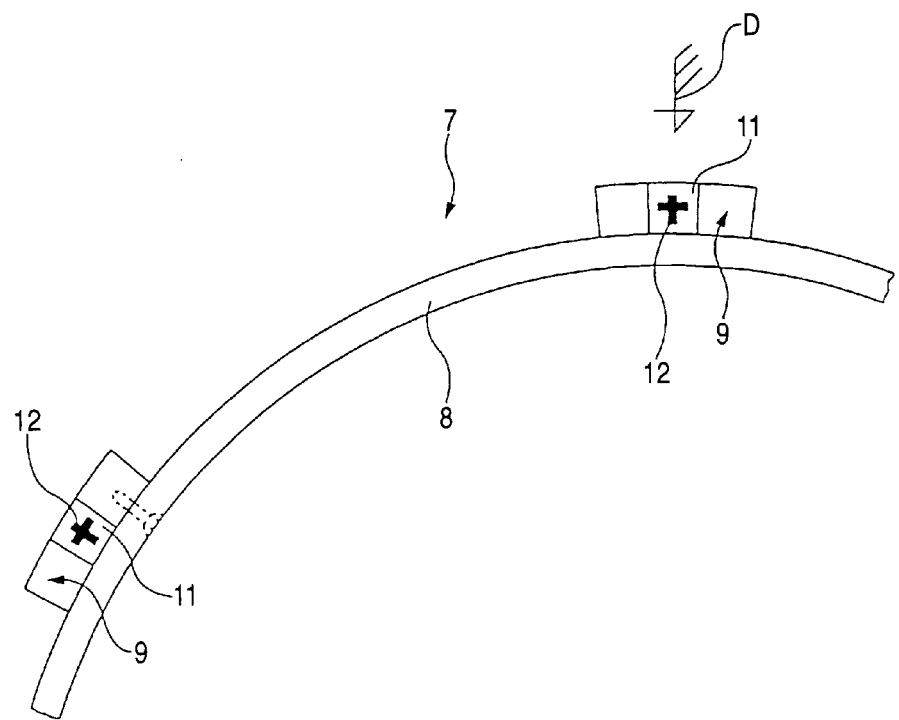
FIG. 13 is a partly sectional diagram showing a supporting member supporting distortion gauges viewed from a side of FIG. 12.
Figure 14:
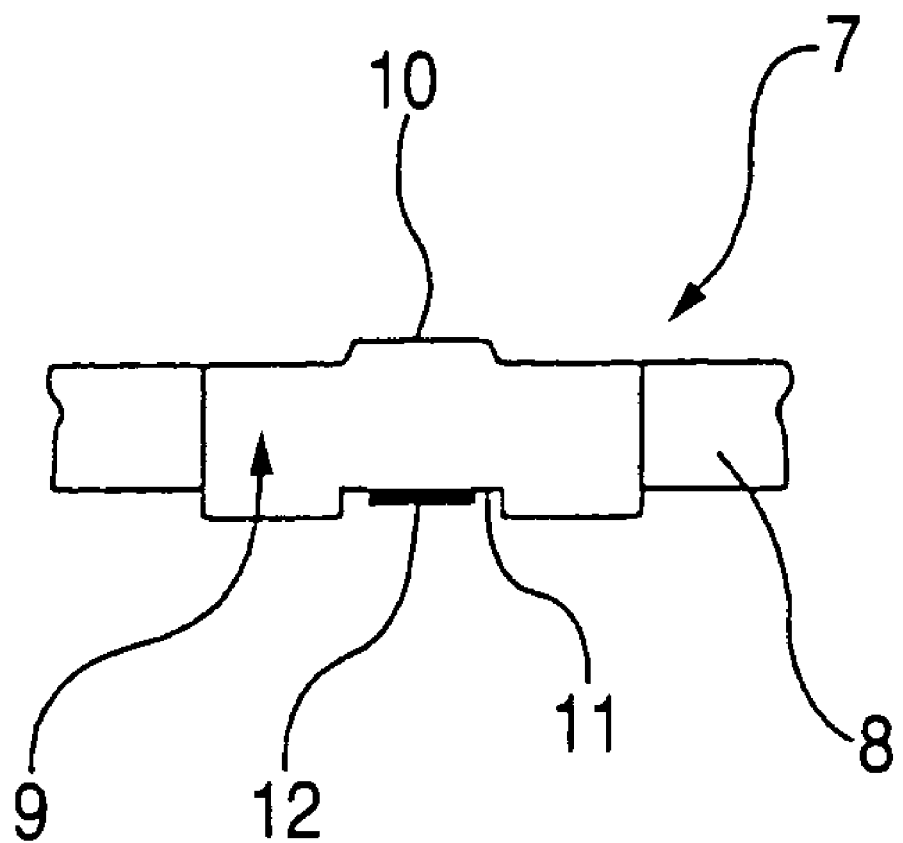
FIG. 14 is a diagram showing the supporting, member viewed as indicated by an arrow D in FIG. 13.

In the aforementioned embodiments, the supporting member 24 fitted in and supported by the housing 3 in which the outer rings 19a, 19b and 63 as fixed rings are fitted may have an electronic tag (non-contact type IC device) provided with a memory, a control section and a transmission/reception section for transmitting and receiving a wireless signal, which is fixed to a part thereof. For example, FIG. 11 illustrates a fourth embodiment of the present invention. In the fourth embodiment, an electronic tag 69 is embedded in and fixed to an axial end (front side as viewed on FIG. 11) of the main body 26 constituting the supporting members 24 at a position where its circumferential phase deviates from that of the protrusions 27, 27 and the substrate 30 in the structure of the first embodiment shown in FIGS. 1 to 8. The electronic tag 69 is a chip-shaped non-contact IC device provided with a memory, a control section and a transmission/reception section for transmitting and receiving a wireless signal. This memory can record data representing information to be managed with regard to the rolling bearing unit with a sensor device such as production step, flow, sale, use, failure, repair, material and disassembly step. The transmission/reception section has a function of converting the digital signal read from the memory to a frequency signal (modulation signal), then combining the modulation signal and a carrier wave to produce a modulated wave and then generating it as a wireless signal and a function of receiving a wireless signal transmitted by an external inputting/outputting device (not shown) such as portable data terminal, taking the frequency signal (modulation signal) out of the modulated wave of the wireless signal and then converting it to a digital signal. When a wireless signal is transmitted from the external inputting/outputting device to the transmission/reception section, the control section acts to record data represented by the wireless signal in the memory or read data from the memory and allow the transmission/reception section to transmit the wireless signal. In the fourth embodiment, a battery for operating the parts of the electronic tag 69 is provided in the supporting members 24. However, by arranging such that the electronic tag 69 can be energized by a wireless wave from the external inputting/outputting device, the electronic tag 69 can be used free of battery.

In the fourth embodiment having the aforementioned constitution, data representing information to be managed with regard to the rolling bearing unit with the sensor device such as production step, currency (flow), sale, use, failure and repair can be recorded in the memory constituting the electronic tag 69 without connecting the electronic tag 69 and the external inputting device to each other with a harness or cable. Further, the data recorded in the memory can be outputted from the external inputting/outputting device as necessary, facilitating the management of data to be managed such as production step. Moreover, when the rolling bearing with the sensor device is no longer needed, the data to be managed can be utilized to reuse it easily. Moreover, in the fourth embodiment, the memory can record data representing the material and disassembly step of the rolling bearing unit with the sensor device, making it easy to automate the disassembly of the rolling bearing unit with the sensor device and the classification of parts thus produced into reusable resources and hence facilitating complete recycling that produces no waste parts.

Though not shown, the present invention may be arranged such that data representing the value of load imposed axially on the rolling bearing detected by the detecting portion of the sensor device can be recorded in the memory constituting the electronic tag 69 and a signal representing the data read from the memory can be transmitted as a wireless signal from the transmission/reception section of the electronic tag 69, which is a transmitting device. In this case, the detected value is outputted to the outputting portion of the external outputting device such as portable data terminal and the load imposed axially on the rolling bearing is adjusted with this detected value. In this arrangement, it is not necessary that the external inputting/outputting device and the member supporting the rolling bearing such as housing 3 be connected to each other with a harness or cable. Accordingly, the replacement of parts to be provided on rotary bearing such as the rolling bearing can be more easily facilitated and the breaking of the harness or cable can be prevented.

The present invention can be effected also when the fixed ring is the inner ring. In this case, the supporting member by which the sensor device is supported is fitted in and fixed to the member in which the inner ring is fitted.

The rolling bearing unit with a sensor device of the present invention has the aforementioned constitution and operation, making it possible to facilitate the replacement of parts to be provided on the rotary bearing portion and prevent the breaking of the cable or harness.

What is claimed is:

1. A rolling bearing unit comprising:
   a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;
   a sensor device for detecting the load imposed axially on the rolling bearing, the sensor device having a detecting portion for detecting the load imposed axially on the rolling bearing, and at least a part of a transmitting device for transmitting as a wireless signal: (i) an output signal outputted from the detecting portion; or (ii) a signal obtained by processing the output signal;

a supporting member for supporting the sensor device, fitted in and supported by a member in which the outer ring or inner ring as the fixed ring is fitted in such an arrangement that it is opposed to an axial end of the outer ring or inner ring as the fixed ring; and a member having at least a part of a receiving device for receiving the wireless signal transmitted from the transmitting device, the member being separately formed from the supporting member, wherein the detecting portion of the sensor device detects the load imposed axially on the supporting member by the outer ring or inner ring as the fixed ring to detect the load imposed axially on the rolling bearing.

2. A rolling bearing unit comprising:

a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;

a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal;

a supporting member for supporting the sensor device, fitted in and supported by a member in which the outer ring or inner ring as the fixed ring is fitted in such an arrangement that it is opposed to an axial end of the outer ring or inner ring as the fixed ring; and a member having at least a part of a receiving device for receiving the wireless signal transmitted from the transmitting device, the member being separately formed from the supporting member, wherein the detecting portion of the sensor device detects the load imposed axially on the supporting member by the outer ring or inner ring as the fixed ring to detect the load imposed axially on the rolling bearing, wherein the supporting member comprises an annularly formed main body and protrusions provided axially protruding at a plurality of circumferential positions on both axial ends of the main body in such an arrangement that circumferential phases of the protrusions disposed on the both axial ends of the main body coincide with each other.

3. The rolling bearing unit according to claim 2, wherein the main body has inner annular wall portions and outer annular wall portions, which radially protrude and disposed on the both axial ends of the main body respectively.

4. The rolling bearing unit according to claim 2, wherein the main body and protrusions are integrally formed by working a metallic material.

5. The rolling bearing unit according to claim 3, wherein the main body and protrusions are integrally formed by working a metallic material.

6. The rolling bearing unit according to claim 2, wherein the detecting portion of the sensor device is disposed on a portion of the periphery of the main body where it coincide with one of the protrusions in the circumferential phase.

7. A rolling bearing unit comprising:

a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;

a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal;

a supporting member for supporting the sensor device, fitted in and supported by a member in which the outer ring or inner ring as the fixed ring is fitted in such an arrangement that it is opposed to an axial end of the outer ring or inner ring as the fixed ring; and a member having at least a part of a receiving device for receiving the wireless signal transmitted from the transmitting device, the member being separately formed from the supporting member, wherein the detecting portion of the sensor device detects the load imposed axially on the supporting member by the outer ring or inner ring as the fixed ring to detect the load imposed axially on the rolling bearing, wherein the sensor device comprises a modulation/demodulation circuit and a coil as the transmitting device, the modulation/demodulation circuit combining the output signal outputted from the detecting portion with a carrier wave to produce a modulated wave or taking a modulation signal out of the modulated wave received through the coil, the coil transmitting and receiving the modulated wave as the wireless signal.

8. A rolling bearing unit comprising:

a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;

a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal;

a supporting member for supporting the sensor device, fitted in and supported by a member in which the outer ring or inner ring as the fixed ring is fitted in such an arrangement that it is opposed to an axial end of the outer ring or inner ring as the fixed ring; and a member having at least a part of a receiving device for receiving the wireless signal transmitted from the transmitting device, the member being separately formed from the supporting member, wherein the detecting portion of the sensor device detects the load imposed axially on the supporting member by the outer ring or inner ring as the fixed ring to detect the load imposed axially on the rolling bearing, wherein the sensor device comprises a modulation circuit and a coil as the transmitting device, the modulation circuit combining the output signal outputted from the detecting portion with a carrier wave to produce a modulated wave, the coil transmitting the modulated wave as the wireless signal.

9. A rolling bearing unit comprising:
a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;
a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal;
a supporting member for supporting the sensor device, fitted in and supported by a member in which the outer ring or inner ring as the fixed ring is fitted in such an arrangement that it is opposed to an axial end of the outer ring or inner ring as the fixed ring; and
a member having at least a part of a receiving device for receiving the wireless signal transmitted from the transmitting device, the member being separately formed from the supporting member,
wherein the detecting portion of the sensor device detects the load imposed axially on the supporting member by the outer ring or inner ring as the fixed ring to detect the load imposed axially on the rolling bearing,
wherein the sensor device comprises a modulation circuit and an antenna as the transmitting device, the modulation circuit combining the output signal outputted from the detecting portion with a carrier wave to produce a modulated wave, the antenna transmitting the modulated wave as the wireless signal.

10. A rolling bearing unit comprising:
a rolling bearing including an inner ring and an outer ring, one of which is a rotary ring, the other of which is a fixed ring, which rotate relative to each other, and a plurality of rolling elements disposed rotatably interposed between an outer ring raceway formed on an inner surface of the outer ring and an inner ring raceway formed on an outer surface of the inner ring;
a sensor device for detecting the load imposed axially on the rolling bearing, the sensor device having a detecting portion for detecting the load imposed axially on the rolling bearing, and at least a part of a transmitting device for transmitting an output signal outputted from the detecting portion or a signal obtained by processing the output signal as a wireless signal;
a supporting member for supporting the sensor device, fitted in and supported by a member in which the outer ring or inner ring as the fixed ring is fitted in such an arrangement that it is opposed to an axial end of the outer ring or inner ring as the fixed ring; and
a member having at least a part of a receiving device for receiving the wireless signal transmitted from the transmitting device, the member being separately formed from the supporting member,
wherein the detecting portion of the sensor device detects the load imposed axially on the supporting member by the outer ring or inner ring as the fixed ring to detect the load imposed axially on the rolling bearing,
wherein the sensor device comprises an electronic tag having a memory, a control section and a transmission/reception section as the transmitting device, the transmission/reception transmitting and receiving the wireless signal.

* * * * *